(12) United States Patent
Wei

(10) Patent No.: US 11,293,738 B2
(45) Date of Patent: Apr. 5, 2022

(54) METHOD AND APPARATUS FOR PROVIDING A MEASURING TAPE WITH INCREASED CUPPING

(71) Applicant: APEX BRANDS, INC., Apex, NC (US)

(72) Inventor: Jimmy Wei, New Taipei (TW)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 17/417,287

(22) PCT Filed: Dec. 20, 2019

(86) PCT No.: PCT/US2019/067820
§ 371 (c)(1),
(2) Date: Jun. 22, 2021

(87) PCT Pub. No.: WO2020/142266
PCT Pub. Date: Jul. 9, 2020

(65) Prior Publication Data
US 2022/0042778 A1 Feb. 10, 2022

Related U.S. Application Data

(60) Provisional application No. 62/786,786, filed on Dec. 31, 2018.

(51) Int. Cl.
*G01B 3/10* (2020.01)
*G01B 3/1003* (2020.01)
(Continued)

(52) U.S. Cl.
CPC ........... *G01B 3/1003* (2020.01); *B21D 31/06* (2013.01); *B24C 1/10* (2013.01); *B24C 3/12* (2013.01); *G01B 2003/1058* (2013.01)

(58) Field of Classification Search
CPC .. B21D 31/06; B24C 1/10; B24C 3/12; G01B 3/1003
(Continued)

(56) References Cited

U.S. PATENT DOCUMENTS 4,275,503 A * 6/1981 Bergkvist ............. G01B 3/1003
33/757
4,652,331 A 3/1987 Plasencia
(Continued)

FOREIGN PATENT DOCUMENTS

| CN | 1926250 A | 3/2007 |
| CN | 102189493 A | 9/2011 |
| CN | 102666016 A | 9/2012 |

OTHER PUBLICATIONS

International Search Report and Written Opinion from related international application PCT/US2019/067820, dated Feb. 25, 2020, all pages cited in its entirety.
(Continued)

*Primary Examiner* — George B Bennett
(74) *Attorney, Agent, or Firm* — Burr & Forman, LLP

(57) ABSTRACT

A method of producing a measuring tape may include providing a cupped blade with substantially uniform cupping over a longitudinal length of the cupped blade, applying a stress relief operation to a selected portion of only a convex side of the cupped blade to increase curvature of the cupped blade in the selected portion of the cupped blade where the stress relief operation includes bead blasting the selected portion via a dual nozzle shot peening assembly to define a combined bead blast area that is substantially centered with respect to a longitudinal centerline of the blade, and operably coupling the cupped blade to a reel assembly and providing the cupped blade and reel assembly within a housing to define the measuring tape device.

20 Claims, 7 Drawing Sheets

(51) Int. Cl.
*B24C 3/12* (2006.01)
*B21D 31/06* (2006.01)
*B24C 1/10* (2006.01)

(58) Field of Classification Search
USPC .............................................. 72/53; 33/771
See application file for complete search history.

(56) References Cited

U.S. PATENT DOCUMENTS

| | | | |
|---|---|---|---|
| 5,596,912 A * | 1/1997 | Laurence | B24C 1/10 |
| | | | 72/53 |
| 5,980,659 A * | 11/1999 | Kawaura | B23P 9/04 |
| | | | 148/535 |
| 6,032,320 A | 3/2000 | McComber et al. | |
| 6,584,820 B1 * | 7/2003 | Benedict | B24C 1/06 |
| | | | 451/38 |
| 7,062,862 B2 * | 6/2006 | Wheaton | G01B 3/1003 |
| | | | 33/757 |
| 7,096,596 B2 * | 8/2006 | Hernandez, Jr. | G01B 3/1003 |
| | | | 33/755 |
| 7,395,608 B2 * | 7/2008 | Liao | G01B 3/1003 |
| | | | 33/757 |
| 10,758,968 B2 * | 9/2020 | Mase | B24C 1/006 |
| 2002/0042978 A1 | 4/2002 | Cheppe et al. | |
| 2010/0031525 A1 * | 2/2010 | Allezy | B32B 27/12 |
| | | | 33/771 |
| 2010/0212157 A1 | 8/2010 | Hennig | |
| 2021/0054895 A1 * | 2/2021 | Zamberger | B21B 1/463 |
| 2021/0131780 A1 * | 5/2021 | Patrangenaru | G01B 3/1003 |
| 2021/0178485 A1 * | 6/2021 | Cornu | B33Y 10/00 |
| 2021/0260701 A1 * | 8/2021 | Nelson | B28B 1/001 |

OTHER PUBLICATIONS

Non-Final Office Action from Chinese Application 201980087329.7 dated Oct. 13, 2021, all pages cited in its entirety.

* cited by examiner

METHOD AND APPARATUS FOR PROVIDING A MEASURING TAPE WITH INCREASED CUPPING

CROSS REFERENCE TO RELATED APPLICATION

This application claims priority to U.S. application No. 62/786,786 filed Dec. 31, 2018, the entire contents of which are hereby incorporated by reference in its entirety.

TECHNICAL FIELD

Example embodiments generally relate to measuring tape devices, and particularly relate to a measuring tape that has increased cupping and a method and apparatus for producing the same.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between an a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For relatively short measuring tapes (e.g., 12 ft or 25 ft), self-retracting mechanisms are very common. For very long measuring tapes (e.g., larger than 100 ft), a manual retracting mechanism is typically employed.

For nearly a century, metallic tape ribbons with a curved (or cupped) and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. The cupping of the metallic tape ribbon further enhances the standout without negatively impacting the ability of the metallic tape ribbon to be wound onto the reel assembly. By employing an end hook at one end of the tape, the user may take advantage of the standout to pay out the measuring tape toward an anchor point on a media that is to be measured and then conduct the measurement without having to physically move to the anchor point to affix the end hook and then move away to make the measurement. Given the time and energy that can be saved by this method of measurement, taking advantage of the standout characteristics of a self-retracting measuring tape is a very popular feature.

Invariably, each measuring tape will have a certain length that effectively defines the maximum standout that can be achieved before the tape bends and effectively collapses. The measuring tape can no longer be extended reliably toward the anchor point once this collapse occurs. However, many users would prefer to reattempt to reach the anchor point, sometimes numerous times, than to physically move to the anchor point and attach the end hook to the anchor point. Thus, having a superior standout could be a powerfully attractive feature for a measuring tape.

BRIEF SUMMARY OF SOME EXAMPLES

Some example embodiments may enable the provision of a longer than normal standout for a measuring tape by providing increased cupping of at least a segment of a blade portion of the measuring tape. Thus, for example, user experience associated with use of the measuring tape may be improved.

In an example embodiment, a shot peening assembly for cupping a measuring tape blade is provided. The assembly may include a first nozzle operably coupled to a high pressure air line and a shot line to enable shot entering a pressurized air stream from the high pressure air line to be propelled against a first portion of a convex side of the blade via the first nozzle, and a second nozzle disposed relative to the first nozzle to form a dual nozzle with the first nozzle. The second nozzle may be operably coupled to the same or a second instance of the high pressure air line and the shot line to enable shot to be propelled against the convex side of the blade via the second nozzle to define a combined bead blast area at the convex side of the blade. The combined bead blast area may be substantially centered with respect to a longitudinal centerline of the blade.

In another example embodiment, a method of producing a measuring tape is provided. The method may include providing a cupped blade with substantially uniform cupping over a longitudinal length of the cupped blade, applying a stress relief operation to a selected portion of only a convex side of the cupped blade to increase curvature of the cupped blade in the selected portion of the cupped blade where the stress relief operation includes bead blasting the selected portion via a dual nozzle shot peening assembly to define a combined bead blast area that is substantially centered with respect to a longitudinal centerline of the blade, and operably coupling the cupped blade to a reel assembly and providing the cupped blade and reel assembly within a housing to define the measuring tape device.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 6A:
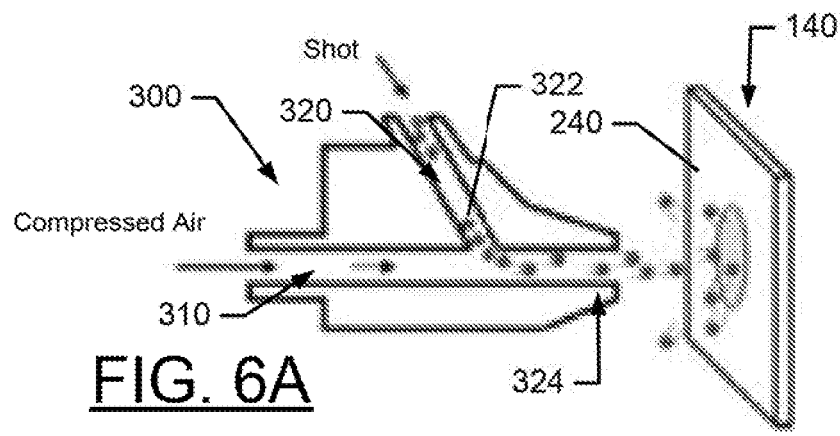
Figure 6B:
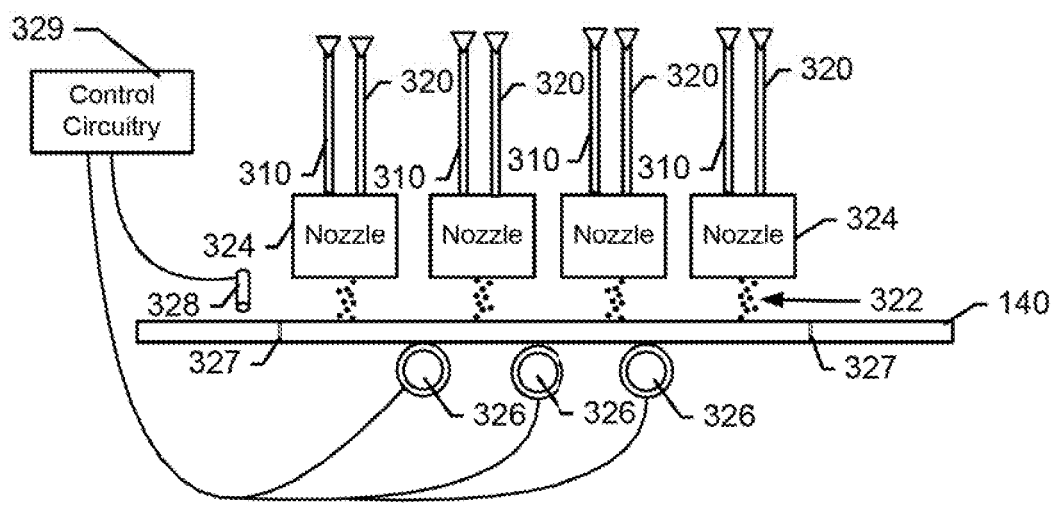
Figure 7A:
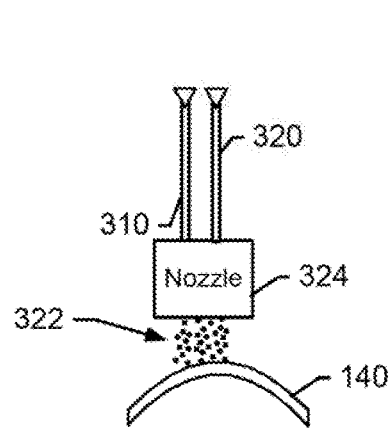
Figure 7B:
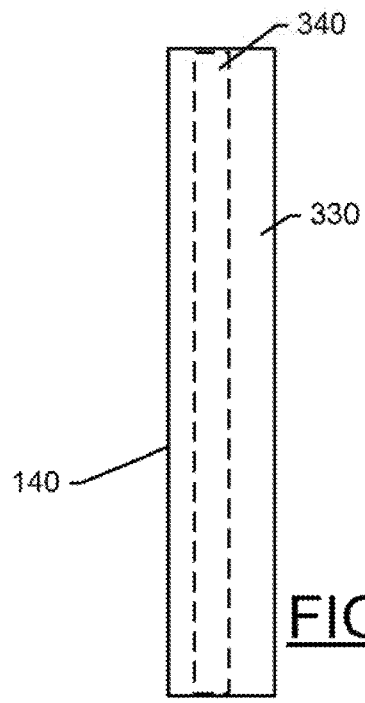
Figure 8A:
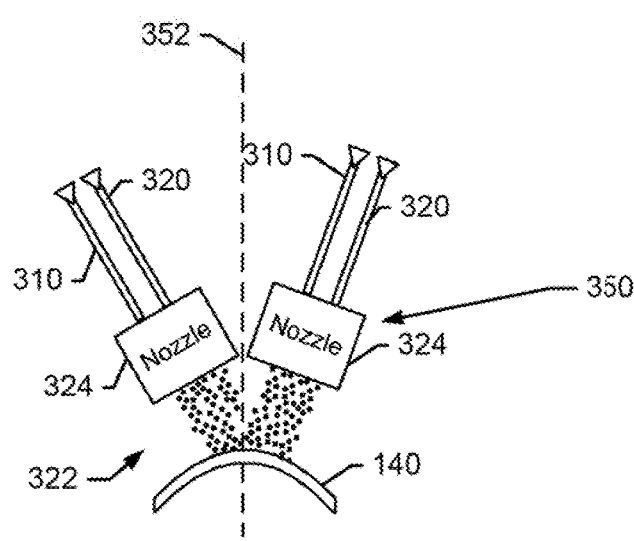
Figure 8B:
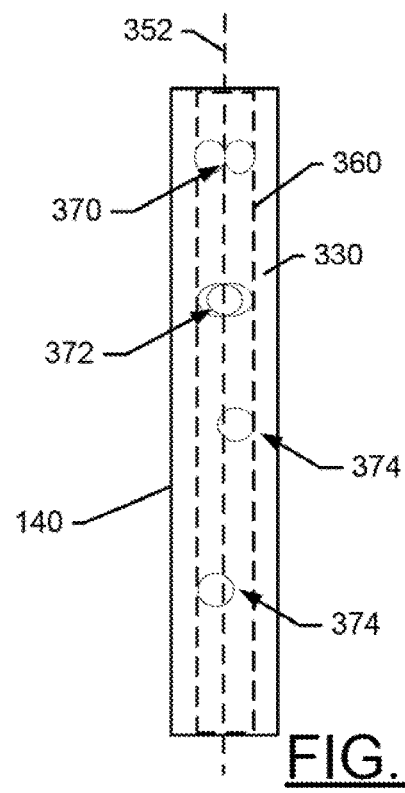
Figure 9A:
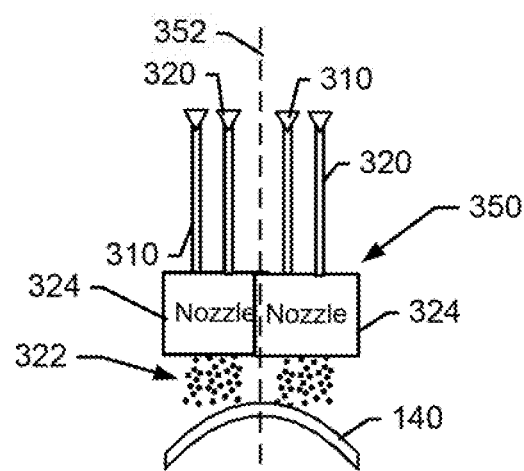
Figure 9B:
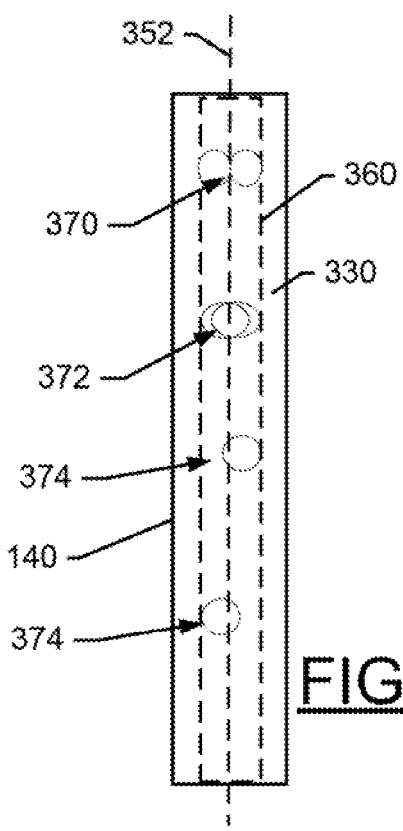
Figure 10A:
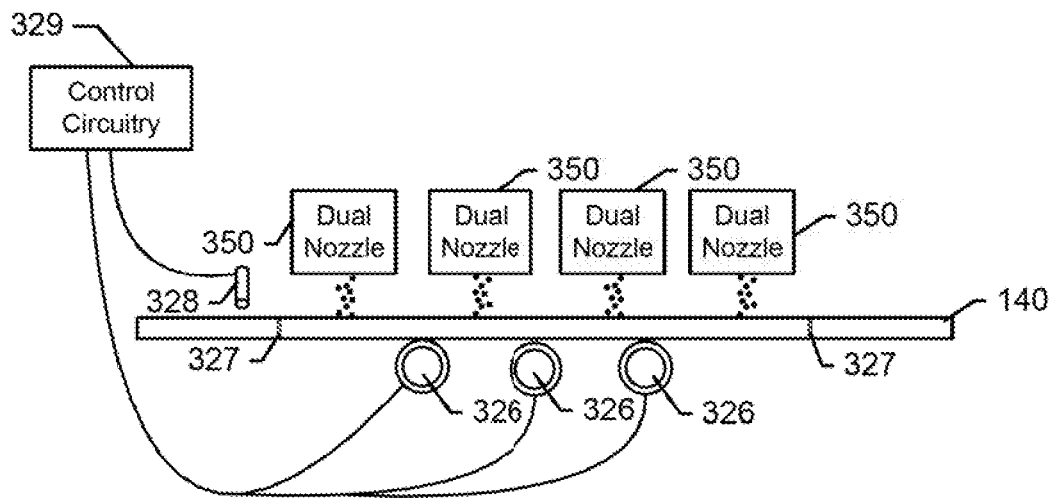
Figure 10B:
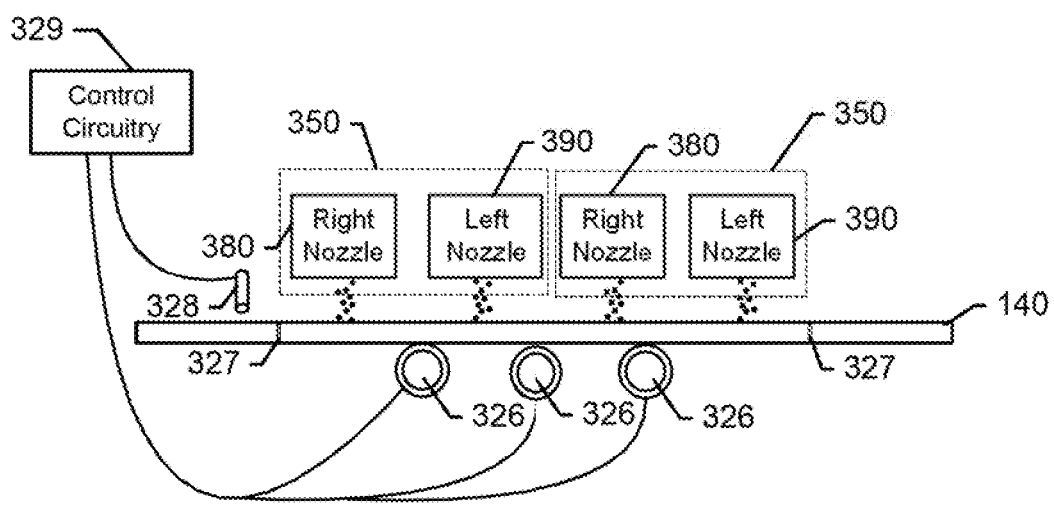
Figure 11:
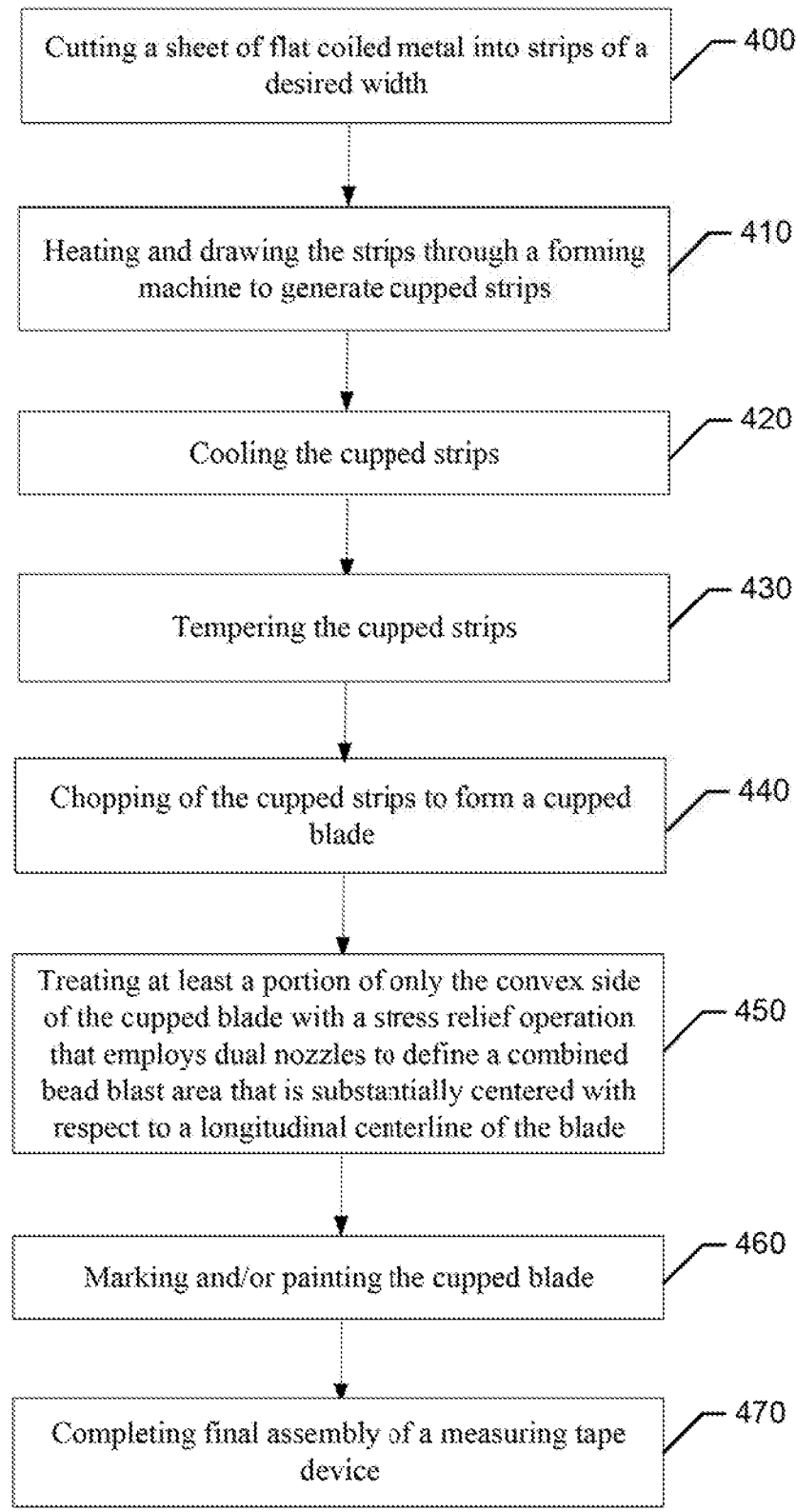

FIG. 6, which is defined by FIGS. 6A and 6B, illustrates a shot peening assembly in accordance with an example embodiment;

FIG. 7, which is defined by FIGS. 7A and 7B, illustrates shot peening with a single nozzle in accordance with an example embodiment;

FIG. 8, which is defined by FIGS. 8A and 8B, illustrates shot peening with angled dual nozzles in accordance with an example embodiment;

FIG. 9, which is defined by FIGS. 9A and 9B, illustrates shot peening with parallel dual nozzles in accordance with an example embodiment;

FIG. 10, which is defined by FIGS. 10A and 10B illustrates shot peening assemblies that employ dual nozzles either collocated (FIG. 10A) or separated from each other (FIG. 10B) linearly along the length of the blade in accordance with an example embodiment; and FIG. 11 illustrates a method of making a measuring tape device having an improved blade standout in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to a method and apparatus for the provision of a measuring tape device that may have an improved blade standout. This may be accomplished by employing increased cupping over at least a segment of the blade at a critical region or zone and, in some cases, by providing the increased cupping over the entire length of the blade. One efficient way to cause the increased cupping is by shot peening a convex side of the blade. Although providing increased cupping has shown itself to be very effective in increasing blade standout during testing, an unintended consequence of blade twisting can occur in some cases. For example, if the equipment used for shot peening is off center with respect to application of the beads (or region of application of the beads), the blade may not be peened symmetrically. The lack of symmetry with respect to the peening process will then tend to give the blade a twist as it is extended out of its housing. Accordingly, it may be desirable to develop methods and devices that are better suited to provide symmetrical peening along the length of any portion of the blade that is processed for increased cupping.

Figure 1:
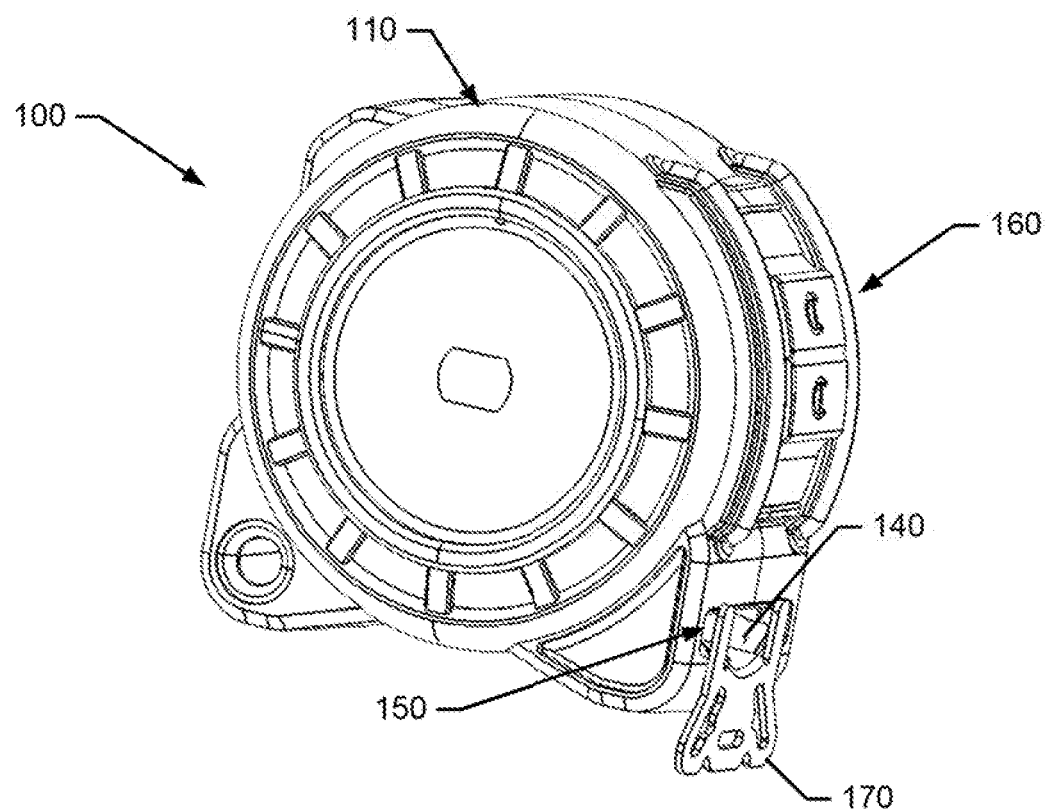
FIG. 1 illustrates a perspective view of a measuring tape device in accordance with an example embodiment.
Figure 2:
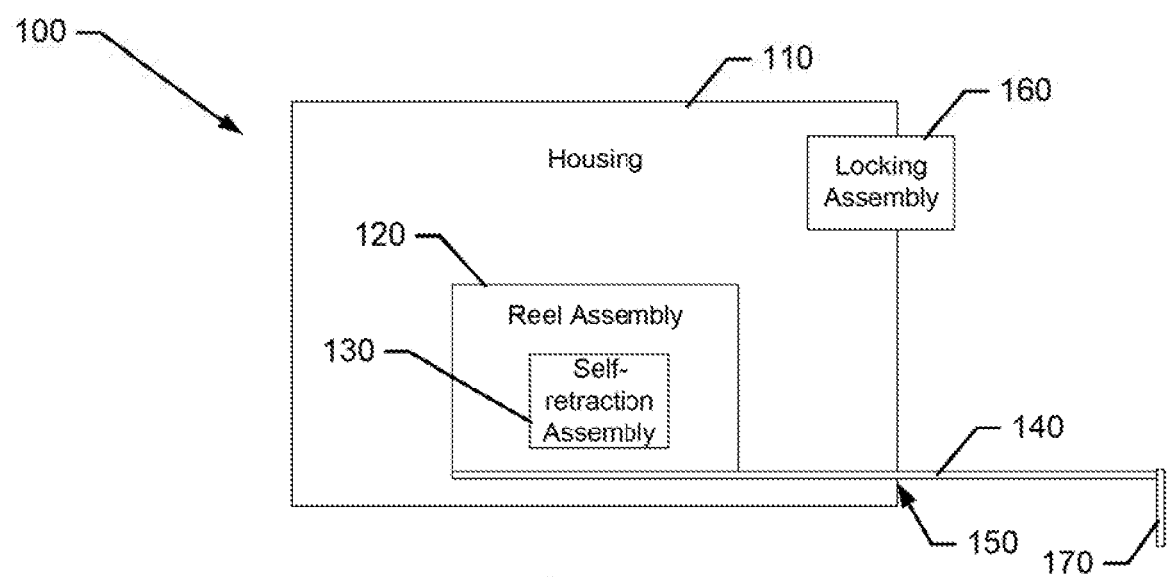
FIG. 2 illustrates a block diagram of the measuring tape device in accordance with an example embodiment.

FIG. 1 illustrates a perspective view of a measuring tape device, and FIG. 2 illustrates a block diagram of such device, in accordance with an example embodiment. Referring now to FIGS. 1 and 2, a measuring tape device 100 of an example embodiment may include a housing 110 inside which a reel assembly 120 and a self-retraction assembly 130 may be provided. A blade 140 (or tape) portion of the device 100 may be wound onto the reel assembly 120. The blade 140 may be paid out through an aperture 150 formed in the housing 110. Although not required, in some cases, a locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140). The blade 140 can be extended in a guided fashion toward an intended target anchor point while the blade 140 continues to have sufficient rigidity to standout. The blade 140 will continue to extend and standout until the weight of the blade 140 extended past the aperture 150 is sufficient to cause the blade 140 to collapse and bend, thereby losing its rigidity and preventing any further guided extension. The loss of sufficient rigidity which causes collapse and bending of the blade 140 generally occurs at a portion of the blade 140 that can be referred to as a "critical region" since it can occur at slightly different points (but generally in the same region) on different extension operations.

A typical blade may be made to have the same width and height (or thickness), and same amount of cupping across its entire length. However, it may be possible to increase the standout capabilities of the blade 140 by changing certain characteristics of the blade 140 at certain strategic locations along the length of the blade 140. For example, the cupping may be increased over an area covering or otherwise proximate to the critical region of the blade 140 to enable the blade 140 to retain its rigidity and avoid collapsing to achieve greater standout. There may be a number of ways to achieve the capability for greater standout using increased cupping strategies. One such way may include the application of pressure along lateral edges of a portion of the blade 140 (presumably near the critical region). For example, two long and straight walls may be provided on opposing sides of the blade 140 after the blade 140 has initially been treated to provide cupping that is common to most blades (by whatever method chosen). The two long and straight walls may then be moved toward each other to bend the blade 140 even more than the cupping that was already provided. In other words, the degree of cupping or amount of curvature may be increased over the range that the two long and straight walls contact the lateral edges of the blade 140.

The increased curvature or cupping of the blade 140 provided by the two long and straight walls may, however, have a positive impact on standout, but may create other problems. For example, a distinct transition point where a prompt jump occurs between portions of the blade 140 having two different degrees of curvature or cupping may be formed at the point at which each of the two long and straight walls terminated. Thus, four distinct transition points (two on each side of the blade 140 separated from each other by the length of the two long and straight walls) may be formed on the blade 140. These distinct transition points may get stuck on the aperture 150 during reeling of the blade 140 by the reel assembly 120. Transitions of this nature are also likely to increase the tendency of the blade 140 to "roll" and break when the blade 140 is extended substantially vertically (as opposed to the typical extension horizontally). Thus, it may be desirable to find a way to increase cupping that does not result in prompt jump changes in curvature of the blade 140. Other advantages may also be achieved by increasing cupping in other ways. The examples of FIGS. 3-5 will now be discussed to illustrate some of the advantages of increasing cupping of the blade 140.

Figure 3:
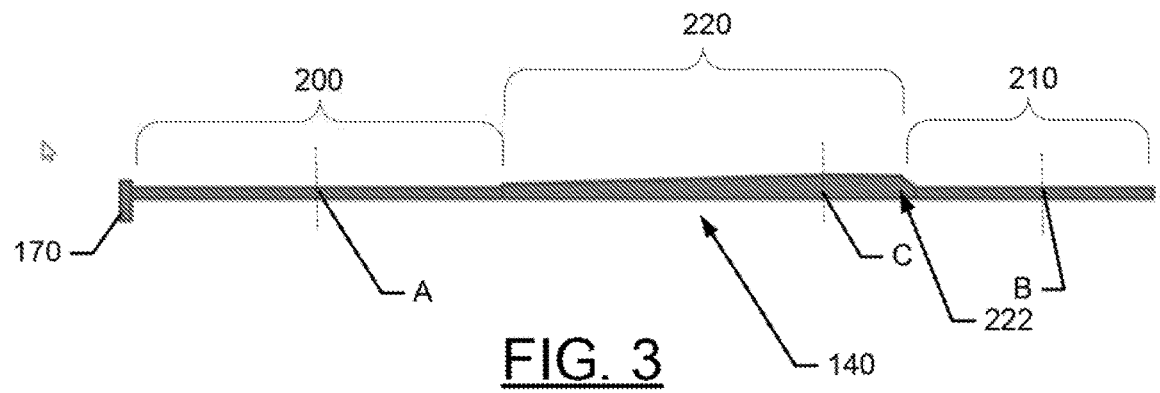
FIG. 3 illustrates a longitudinal cross section view of a blade portion of a measuring tape device in accordance with an example embodiment.
Figure 4:
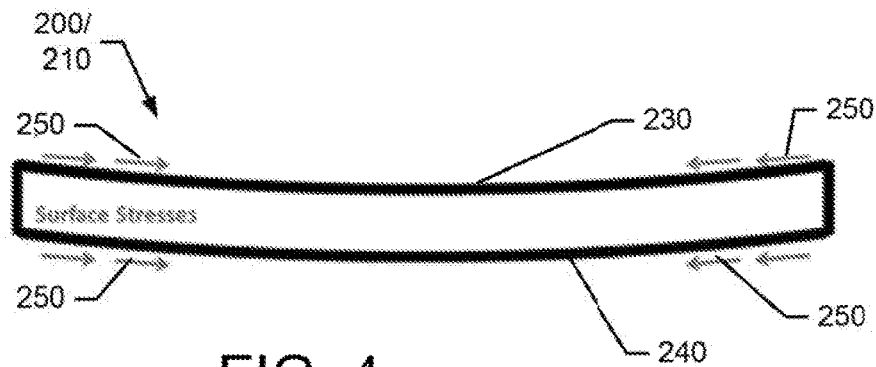
FIG. 4 illustrates a transversal cross section view of the blade portion of the measuring tape device outside a critical region in accordance with an example embodiment.
Figure 5:
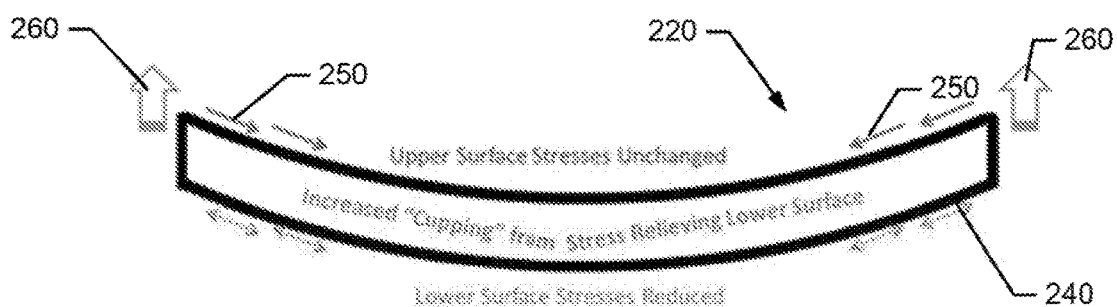
FIG. 5 illustrates a transversal cross section view of the blade portion of the measuring tape device at the critical region in accordance with an example embodiment.

In this regard, FIG. 3 illustrates a longitudinal cross section view of the blade 140 to facilitate the definition of various regions of the blade 140, and to show one particular example embodiment for improving standout of the blade 140. FIG. 4 illustrates a transversal cross section view of the blade 140 of FIG. 3, taken at either point A or point B of FIG. 3 (or taken at point C prior to the application of stress relief operations as described herein). FIG. 5 illustrates a transversal cross section view of the blade 140 of FIG. 3 taken at point C (i.e., within the critical region) after stress relief operations in accordance with one example embodiment.

Referring now to FIGS. 3-5, it can be appreciated that the blade 140 may include a first non-critical region 200 disposed proximate to a first end of the blade 140 and a second non-critical region 210 disposed proximate to a second end of the blade 140. The first end of the blade 140 may extend from the end hook 170 to a start of a critical region 220. The critical region 220 may then extend to meet the second non-critical region 210. The second non-critical region 210 may then extend from the critical region 220 to the second end of the blade 140. Thus, the critical region 220 is disposed between the first and second non-critical regions 200 and 210.

In some cases, the critical region 220 may be disposed spaced apart from the end hook 170 by at least a particular distance that is determined based on a combination of factors including width of the blade 140, material used to form the blade 140, amount of cupping of the blade 140, thickness of the blade 140, etc. Thus, the critical region 220, which is a range of locations along the longitudinal length of the blade 140, may slide closer to or farther from the end hook 170 with different combinations of the above listed factors, and may expand in size based on the different combinations of the above listed factors. For most common sizes of measuring tape devices, the critical region 220 may lie in a range between about 8 feet to about 15 feet from the end hook 170. However, other ranges are possible.

In an example embodiment, an amount of curvature or cupping of the blade 140 in the first and second non-critical regions 200 and 210 may be less than the amount of curvature or cupping of the blade 140 in the critical region 220. By increasing the degree or amount of cupping in the critical region 220 relative to the degree or amount of cupping in the first and second non-critical regions 200 and 210, the critical region 220 may be more likely to maintain rigidity and avoid collapse on payout of the blade 140 through the critical region 220. The blade 140 may therefore have a longer standout. However, the increased cupping provided in the critical region 220 may be accomplished via a stress relief operation that may be easier to employ and avoid the formation of distinct or prompt jump-type transition points on the blade 140, which would result from mechanical bending operations. In this regard, a transition zone 222 may be defined between the critical region 220 and its intersection with the first and second non-critical regions 200 and 210. In some cases, an amount of cupping in the transition zone may change relatively slowly and/or evenly from the amount of cupping in the first and second non-critical regions 200 and 210 to the amount of cupping in the critical region 220 (e.g., 20% higher than cupping in the non-critical regions). For example, the transition zone may be greater than half an inch long to avoid any prompt jumps in cupping degree along the blade 140.

Referring to FIG. 4, it should be appreciated that when cupping is performed on the blade 140 (e.g., over the entire length of the blade 140), the cupping creates surface stresses on both a concave side 230 and a convex side 240 of the blade 140. The concave side 230 is generally the top side when the blade 140 is used for measuring a medium, and generally has measurement markings disposed thereon. The concave side 230 may be expected to face away from the medium being measured. The convex side 240 is typically the bottom side when the blade 140 is used for measuring, and lies next to the medium being measured. As shown in FIG. 4, the concave side 230 and the convex side 240 may have substantially matching degrees of concavity and convexity, respectively. In other words, the amount of curvature or cupping in the transverse direction is substantially the same for both the concave side 230 and the convex side 240 although one side is curved inward and the other outward. The curvature or cupping of the blade 140 may be provided during the production process to generate the two substantially equal degrees of curvature, and corresponding surface stresses as shown by arrows 250 in FIG. 4. In this regard, the production process may include, for example, heating a metallic sheet material that has been cut to the desired width and then drawing the material through a structure that forms the drawn material to have the cupped transverse cross section. This cupped structure may then be cooled and tempered, resulting in the surface stresses shown in FIG. 4.

Working a surface of a material such as metal using certain processes that relieve the tensile stresses (e.g., residual surface stresses) on the surface can modify the mechanical properties of the metals in potentially positive ways. For example, relieving the tensile stresses on metallic surfaces (including replacement of tensile stresses with compressive stresses) can strengthen the materials. In some cases, the stress relief operations cause surface materials to be spread plastically to change mechanical properties of the surface to replace tensile stress with compressive stress. Such plastic deformation may also alter the shape of the surface that is plastically deformed. Moreover, in a case where opposing surfaces are treated differently (e.g., where one surface is plastically deformed to relieve tensile stresses and the opposing surface is not), a bending of the material between the surfaces may result. Referring to FIG. 5, lowering tensile stresses on the surface of the convex side 240, while not altering stresses on the surface of the concave side 230 may cause increased cupping in the critical region 220 (as shown by arrows 260).

The working of the surface of the convex side 240 of the blade 140 in the critical region 220 may be accomplished via a number of different methods. For example, as shown in FIG. 6A, a shot peening assembly 300 may be used to cold work the convex side 240 of the blade 140 (at least in the critical region 220). The shot peening assembly 300 may include a high pressure air line 310 and a shot line 320 that enables shot 322 entering a pressurized air stream from the high pressure air line 310 to be propelled against the surface of the convex side 240 via a nozzle 324. The shot 322 may act like small ball peen hammers plastically deforming the surface of the convex side 240. The convex side 240 may plastically deform while reducing tensile stresses on the surface of the convex side 240 and cup further in the direction shown by arrow 260 in FIG. 5. Thus, the portion of the blade 140 (e.g., the critical region 220) that is cold worked using shot peening by the shot peening assembly 300 may have a greater degree of curvature or cupping than other portions of the blade 140. In some cases, the degree of cupping may be increased by at least 20%. However, more or less cupping can be achieved based on altering the time period over which the shot 322 is propelled against the surface of the convex side 240, the size of the shot 322, the pressure employed in the high pressure air line 310 or other factors. In an example embodiment, the shot 322 could be embodied as sand, metal, plastic, or other rigid materials. Metal may be used in some cases in order to extend the life of the shot 322, and allow for reuse of shot 322. However, plastic materials may be preferred for the shot 322 in other cases. For example, plastic may abrade surfaces less than metal or sand. Thus, in certain instances, such as when the blade 140 is already painted and/or printed, plastic materials may be advantageous for use as the shot 322. In effect, if the production process includes painting and/or printing the blade 140 before peening, then the use of plastic shot may be preferable.

If shot peening is employed in the critical region 220, the shot 322 may bombard the surface of the convex side 240 from a first end of the critical region 220 to a second and opposite end of the critical region 220. However, unlike mechanical bending, the working of the surface using shot peening does not create a prompt jump or distinct change in the degree of cupping at the first and second ends of the critical region 220. Instead, a gradual transition is formed as the material near the first and second ends of the critical region 220 is gradually altered in its curvature from no increased curvature immediately outside the critical region 220 to full increased curvature at points more distant from the edges and within the critical region 220. The lack of a distinct change in cupping makes the blade 140 less susceptible to catching on the aperture 150, and facilitates easier reeling.

The shot peening assembly 300 may include a single nozzle 324, as shown in FIG. 6A. However, the addition of more nozzles may be helpful in improving throughput in some cases. As such, FIG. 6B illustrates a plurality of nozzles 324 and rollers 326 provided in series with each other for conveying the blade 140 proximate to the nozzles 324. As can be appreciated from the shot peening assembly 300' of FIG. 6B, increasing the number of nozzles 324 that are provided in series with each other may correspondingly increase throughput for the system. In this regard, for example, more nozzles 324 in series may enable the provision of an equal amount of peen to a surface over a higher blade feed rate. Thus, the rollers 326 may convey the blade 140 past the nozzles 324 at a higher speed than the shot peening assembly 300 of FIG. 6A, which only has a single nozzle 324. In some cases, the blade 140 may be printed with markers 327 that indicate specific lengths along the blade 140. A photoeye 328 may be provided to detect the markers 327 and control circuitry 329 may operate the nozzles 324 to apply shot 322 over only selected ranges of the blade 140, as determined from the markers 327. In this regard, the markers 327 could directly indicate start and stop points for peening. Alternatively, the markers 327 may be used by the control circuitry 329 to determine the selected range (e.g., the critical region 220) that is to be peened. For example, if the critical range 220 is from 7 feet to 15 feet, the markers 327 could indicate a start point at 7 feet and a stop point at 15 feet. Alternatively, the markers 327 could indicate foot long intervals and the control circuitry 329 could detect the marker indicating 7 feet to start peening and detect the marker indicating 15 feet and stop peening.

In an example embodiment, the control circuitry 329 may be configured to interface with the rollers 326 to control the feed rate and the orientation of the blade 140 relative to the nozzles 324. The feed rate may be controlled based on the portion of the blade 140 that is passing below the nozzles 324. For example, the feed rate may be high from zero to 7 feet, and then slow down from 7 feet to 15 feet for the application of peening. After the 15 foot point, peening may be stopped and the feed rate may again be increased by the control circuitry 329. This variable feed rate control may enable the control circuitry 329 to minimize the overall processing time and machine capacity while maximizing the effectiveness of cupping that is performed by the peening process. An accumulator may be provided on either side of the nozzles 324 to allow control of the feed rate during the treatment of the entire blade 140. Other parameters may also be adjustable or otherwise controlled by the control circuitry 329. For example, the air pressure in the high pressure air line 310 may be increased or decreased responsive to adjustments implemented by the control circuitry 329. Alternatively or additionally, a valve or other control component may be inserted in the shot line 320, and operated by the control circuitry 329, to enable the amount of shot 322 that is fed into the shot line 320 to be controlled. Thus, the material flow rate into the shot line 320 may be controlled by the control circuitry 329.

FIG. 7A illustrates a cross section view of the blade 140 taken at a point at which one of the nozzles 324 of FIG. 6B applies shot 322 to a convex side of the blade 140. As can be appreciated from FIG. 7A, the shot 322 may strike a belly portion 330 (i.e., the convex side) of the blade 140 over a treatment range 340 (i.e., a bead blast area) that extends transversely across the belly portion 330 of the blade 140. Although the treatment range 340 may also have a longitudinal extent, it should be appreciated that the longitudinal extent of the treatment range 340 is essentially formed as a continuous line having a width defined by the transverse width of the treatment range 340 and running longitudinally along the belly portion 330 of the blade 140 due to the fact that the blade 140 is transported by the rollers 326 as discussed above. If the treatment range 340 is off center relative to a longitudinal centerline of the blade 140, as shown in FIG. 7B, then a twisting of the blade 140 may occur when the blade 140 is extended out of the housing 110 as discussed above. In this regard, failure to peen the blade 140 symmetrically along a length of the blade 140 may result in inferior performance of the measuring tape device 100.

The treatment range 340 may end up being off center if one or more of the nozzles 324 of the assembly shown in FIG. 6B is not aligned exactly with the longitudinal centerline of the blade 140. This can occur either due to a number of reasons. For example, the nozzle 324 may be mounted at an angle (even a very slight angle) other than normal relative to the apex or longitudinal centerline of the blade 140. As another example, although the nozzle 324 could be mounted to direct beads 322 exactly at 90 degrees relative to a plane in which the blade 140 lies as the blade 140 is carried by the rollers 326 proximate to the nozzles 324, one or more of the nozzles 324 may be mounted out of alignment with the longitudinal centerline of the blade 140. The rollers 326 may carry the blade 140 out of alignment with the nozzles 324 if the rollers 326 are not securely and accurately mounted. Still other reasons for a lack of alignment of the nozzles 324 and for subsequent lack of centering of the treatment range 340 transversely across the blade 140 may also exist. However, in any such case, the treatment range 340 being off center will very likely cause the undesirable twisting of the blade 140 during extension out of the housing 110.

To reduce the chances of having the treatment range 340 be off center to cause blade twist, some example embodiments may utilize a nozzle arrangement that employs a set of two instances of the nozzles 324 that operate at least in part of opposing sides of the longitudinal centerline or apex of the blade 140. In some cases, two instances of the nozzles 324 may replace each individual instance of the nozzles 324 shown in FIG. 6B. However, in other cases, each of the nozzles 324 of FIG. 6B may simply alternate which side (e.g., right or left) of the longitudinal centerline or apex of the blade 140 the respective nozzles 324 aim at for bead blasting. In either case, i.e., whether the two nozzles 324 are next to each other or spaced apart from each other, the set of two nozzles 324 may be referred to as a dual nozzle 350 or dual nozzle assembly. One example of the dual nozzle 350 is shown in FIG. 8A. In this example, the dual nozzle 350 includes two instances of the nozzle 324 placed side by side, but moved horizontally outwardly relative to a plane 352 bisecting the blade 140 (i.e., through the apex or longitudinal centerline of the blade 140). Meanwhile, each of the nozzles 324 of the dual nozzle 350 may be arranged to aim the shot 322 toward (or proximate to) the apex of the blade 140 in order to define a combined treatment range 360 (which is the longitudinal extension of the combined bead blast area of the nozzles over a length of the blade 140) that is substantially centered on the plane 352 bisecting the blade 140, as shown in FIG. 8B.

FIG. 8B shows some example bead blast patterns that could be provided by the arrangement shown in FIG. 8A. In this regard, FIG. 8B shows a substantially non-overlapping bead blast area 370 that may be formed by the dual nozzle 350 arrangement shown in FIG. 8A where the nozzles 324 are aimed to have their respective bead blast patterns meet at the plane 352 with relatively little overlap as shown by the substantially non-overlapping bead blast area 370. Thus, an edge of each of the respective bead blast patterns may be aimed substantially at the plane 352.

FIG. 8B also shows an overlapping bead blast area 372 formed such that at least at the apex, and on either side thereof, the individual bead blast patterns of the nozzles 324 overlap across the plane 352. The overlapping bead blast area 372 may be formed by the dual nozzle 350 arrangement shown in FIG. 8A, except that each nozzle 324 aims at a point at or proximate to the plane 352 so that the bead blast patterns span across the plane 352. It should be appreciated that, the amount of overlap could vary from a small amount to substantially spanning a transverse width of the combined treatment range 360. In this regard, the overlapping bead blast area 372 shows a relatively large amount of overlap, but smaller amounts of overlap are also possible.

As can be appreciated from FIG. 8B, a linearly offset bead blast area 374 may also be formed by nozzles 324 that are offset from each other along the longitudinal length of the blade 140. In this regard, as noted above, every other nozzle 324 in FIG. 6B could be directed fully or mainly to define a bead blast area on an opposite side of the plane 352 than any adjacent nozzle 324. Each alternating nozzle 324 could then be referred to as either a left nozzle (aimed to the left side of the plane 352) or a right nozzle (aimed to the right side of the plane 352). This results in the application of bead blasting to both sides of the plane 352, as described above. However, the bead blasting on opposing sides of the plane 352 occurs, for any given location, in sequence instead of simultaneously. There could either be no extension of any particular one of the bead blast patterns over the plane 352, or any desired degree of extension over the plane 352 could be provided. The bead blasting on both sides of the plane 352 tends to offset any tendency to twist for the blade 140.

Although the dual nozzle 350 could be arranged so that each of the nozzles 324 is tilted at an angle relative to the plane 352 bisecting the blade 140, as shown in FIG. 8A, other arrangements are also possible. For example, each of the nozzles 324 could be arranged to aim a stream of beads 322 substantially parallel to the plane 352 on either side thereof. FIG. 9A illustrates just such an example. As shown in FIG. 9B, the exact same combined treatment area 360 can be achieved with this arrangement. Moreover, each of the substantially non-overlapping bead blast area 370, the overlapping bead blast area 372, and the linearly offset bead blast area 374 can also be achieved with the parallel arrangement of FIG. 9A. In this regard, the streams of beads 322 may not overlap to achieve the substantially non-overlapping bead blast area 370. Meanwhile, the nozzles 324 of the dual nozzle 350 may have overlapping streams to define the overlapping bead blast area 372 while peening some overlapped region simultaneously. Additionally, by alternating the nozzles 324 with respect to the plane 352 while being linearly spaced apart from each other, the linearly offset bead blast area 374 can also be achieved via the parallel arrangement of FIG. 9A.

Regardless of the specific arrangement employed, the dual nozzle 350 (i.e., a set of nozzles 324 that are configured to apply a stream of beads 322 to opposite sides of the apex or longitudinal centerline of the blade 140 either in sequence or simultaneously to a given location along the belly portion 330 of the blade 140) may provide a self-centering treatment so that the combined treatment range 360 is substantially symmetrical about the plane 352 bisecting the blade 140. Accordingly, a more uniform distribution of the cupping curvature along the transverse direction of the blade 140 may be achieved over the entire length of the blade 140 to which cupping is applied, and twisting is reduced or avoided all together. The dual nozzle 350 may also increase the amount of beads 322 that can be applied per unit area relative to the arrangement shown in FIG. 6B, and may increase the spread of peening treatment along the belly portion 330 of the blade 140.

FIG. 10A illustrates a modification of the system of FIG. 6B using dual nozzles 350 that include pairs of collocated nozzles 324. In this regard, the dual nozzles 350 may otherwise be operated as discussed above in reference to FIG. 6B. However, the dual nozzles 350 may each be a pair of nozzles 324 located at the same position along the length of the blade 140 (e.g., to form the non-overlapping bead blast area 370 or the overlapping bead blast area 372 of FIG. 8B or 9B). Each pair of nozzles 324 of the dual nozzles 350 in FIG. 10A could be arranged as shown in FIG. 8A (i.e., angled relative to the plane 352 and defining a bead stream that is also angled) or 9A (i.e., defining a bead stream that extends parallel to the plane 352).

FIG. 10B illustrates modification of the system of FIG. 6B using dual nozzles 350 that include linearly offset pairs of right nozzles 380 and left nozzles 390. In this regard, the dual nozzles 350 may otherwise be operated as discussed above in reference to FIG. 6B. However, the dual nozzles 350 may each be a pair of nozzles 324 located at a different (spaced apart) position along the length of the blade 140 (e.g., to form the linearly offset bead blast area 374 of FIG. 8B or 9B with any desired degree of extension over the plane 352 for each respective bead blast area). Each pair of right and left nozzles 380 and 390 of the dual nozzles 350 in FIG. 10B could be arranged as shown in FIG. 8A (i.e., angled relative to the plane 352 and defining a bead stream that is also angled) or 9A (i.e., defining a bead stream that extends parallel to the plane 352).

Some example embodiments may effectively add, between the first and second non-critical regions 200 and 210, a portion of the blade 140 (e.g., at the critical region 220) that has enhanced cupping or curvature relative to the amount of curvature of the blade 140 in the first and second non-critical regions 200 and 210. The width of the blade 140 in the critical region 220 may be slightly less than the width of the blade 140 in the first and second non-critical regions 200 and 210 due to the increased curvature of the blade 140 in the critical region 220. However, the thickness of the blade 140 may effectively remain unchanged, or at least any material removal or plastic deformation may only create negligible changes to the thickness of the blade 140 in the critical region 220.

Although the area of enhanced cupping (e.g., in the critical region 220) may not experience a rapid or prompt change in the amount of cupping at ends of the critical region 220 due to a gradual change in cupping being experienced at these points, the amount of cupping may otherwise be substantially similar over interior portions of the critical region 220 (e.g., portions thereof that are spaced apart from the respective opposing ends). However, if desired, the amount of cupping could be increased even further at specific portions of the critical region 220 (e.g., in the overlap region and proximate to the apex) to achieve a non-uniform amount of cupping within the critical region 220. Additionally or alternatively, the entire length of the blade 140 (or a substantial portion thereof) may be treated to increase the amount of cupping in the manner described herein.

FIG. 11 illustrates a block diagram for a method of producing a tape measuring device in accordance with an example embodiment. As shown in FIG. 11, the method may include cutting a sheet of flat coiled metal (e.g., steel) into strips of a desired width at operation 400. As an example, if the metal sheet had a width of 24 inches and the desired width (of the blade 140) is one inch, then 24, one inch strips may be cut at operation 400. The method may include heating and drawing the strips through a forming machine to generate cupped strips at operation 410. The cupped strips may be curved by the forming machine while hot, and may then the cupped strips may be cooled at operation 420. Optionally, the cupped strips may be tempered at operation 430 prior to chopping of the cupped strips (tempered or otherwise) to form a cupped blade at operation 440. The chopping of the cupped strips may cut the cupped strips to the desired length of the tape measuring device for which they will form the blade. For example, the cupped strips may be chopped to 10 ft, 25 ft, 35 ft or 50 ft lengths for respective different measuring tapes. At operation 450, at least a portion of only the convex side of the cupped blade may be bead blasted as a stress relief operation that employs dual nozzles to application of two overlapping or non-overlapping bead blast regions on opposing sides of the apex of longitudinal centerline of the blade. For example, the critical region of the cupped blade may be treated with the stress relief operation using dual nozzles to define a combined bead blast area that is substantially centered with respect to a longitudinal centerline of the blade. The stress relief operation may enhance the cupping (e.g., the degree of curvature) of the cupped blade in the corresponding portion. Thereafter, the cupped blade may optionally be painted and/or marked at operation 460 prior to final assembly of a measuring tape device (e.g., attaching the cupped blade to a reel assembly and providing the same within a housing and affixing an end hook, etc.) at operation 470. However, as mentioned above, operations 450 and 460 could be swapped in their ordering in some cases. Moreover, other operations could be swapped in their ordering in some cases. For example, operation 440 may occur between operations 460 and 470 in some examples.

However, it should be appreciated that the steps or operations associated with processing metal or other materials to achieve the cupped blade may be changed with respect to their specific content or order in some cases. Thus, the method more generally could be stated as providing a cupped blade with substantially uniform cupping over a longitudinal length of the blade and then performing operation 450 (perhaps also followed by operations 460 and 470) on the cupped blade. As such, operations 400 to 440 could be one example of how to provide the cupped blade with the substantially uniform cupping over the longitudinal length of the blade.

In some cases, the method (or portions or operations thereof) may be augmented or modified, or additional optional operations may be included. For example, in some cases, providing the cupped blade with substantially uniform cupping may include cutting a sheet of material into strips of a desired width, heating and drawing the strips through a forming machine to generate cupped strips, cooling the cupped strips, and chopping the cupped strips to a desired length to define the cupped blade. In some cases, providing the cupped blade with substantially uniform cupping may further include tempering the cupped strips prior to chopping the cupped strips. In an example embodiment, applying the stress relief operation may include employing shot peening to plastically deform the selected portion via a first nozzle and a second nozzle of the dual nozzle such that a bead stream from each of the first and second nozzles is angled with respect to a plane bisecting a longitudinal centerline of the blade. In an example embodiment, applying the stress relief operation may include employing shot peening to plastically deform the selected portion via a first nozzle and a second nozzle of the dual nozzle such that a bead stream from each of the first and second nozzles is parallel with respect to a plane bisecting a longitudinal centerline of the blade. In some cases, applying the stress relief operation may include employing shot peening to plastically deform the selected portion via a first nozzle and a second nozzle of the dual nozzle. In this regard, in some cases, the first and second nozzles of the dual nozzle may be disposed to generate overlapping bead blast areas that each traverse a plane bisecting a longitudinal centerline of the blade. In an example embodiment, the first and second nozzles of the dual nozzle may be disposed to generate non-overlapping bead blast areas that meet each other at a plane bisecting a longitudinal centerline of the blade. In some cases, the first and second nozzles of the dual nozzle may be disposed to be separated from each other along a length of the blade such that the first nozzle aims a first bead stream substantially at a left side of a plane bisecting a longitudinal centerline of the blade and the second nozzle aims a second bead stream substantially at a right side of the plane. In an example embodiment, the first and second nozzles of the dual nozzle may be configured to simultaneously apply the first and second bead streams to a same location along a length of the blade or sequentially apply the first and second bead streams to a same location along a length of the blade.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A shot peening assembly for cupping a measuring tape blade, the assembly comprising:
   a first nozzle operably coupled to a high pressure air line and a shot line to enable shot entering a pressurized air stream from the high pressure air line to be propelled against a first portion of a convex side of the blade via the first nozzle;
   a second nozzle disposed relative to the first nozzle to form a dual nozzle with the first nozzle, the second nozzle being operably coupled to the same or a second instance of the high pressure air line and the shot line to enable shot to be propelled against the convex side of the blade via the second nozzle to define a combined bead blast area at the convex side of the blade,
   wherein the combined bead blast area is substantially centered with respect to a longitudinal centerline of the blade.

2. The assembly of claim 1, wherein the first and second nozzles of the dual nozzle are disposed proximate to each other substantially equidistant from a plane bisecting the blade through an apex of the blade as the blade is transported proximate to the assembly.

3. The assembly of claim 2, further comprising a plurality of rollers configured to transport the blade proximate to the dual nozzle.

4. The assembly of claim 3, further comprising at least a second dual nozzle disposed to be separated from the dual nozzle along a length of the blade.

5. The assembly of claim 2, wherein the first and second nozzles of the dual nozzle are disposed at an angle with respect to the plane.

6. The assembly of claim 2, wherein the first and second nozzles of the dual nozzle are disposed to propel respective streams of shot in directions parallel to the plane.

7. The assembly of claim 2, wherein the first and second nozzles of the dual nozzle are disposed to generate overlapping bead blast areas that each traverse the plane.

8. The assembly of claim 2, wherein the first and second nozzles of the dual nozzle are disposed to generate non-overlapping bead blast areas that meet each other at the plane.

9. The assembly of claim 2, wherein the first and second nozzles of the dual nozzle are disposed to be separated from each other along a length of the blade such that the first nozzle aims a first bead stream substantially at a left side of the plane and the second nozzle aims a second bead stream substantially at a right side of the plane.

10. The assembly of claim 9, wherein the first and second nozzles of the dual nozzle are configured to simultaneously apply the first and second bead streams to a same location along a length of the blade.

11. The assembly of claim 9, wherein the first and second nozzles of the dual nozzle are configured to sequentially apply the first and second bead streams to a same location along a length of the blade.

12. A method of producing a measuring tape device, the method comprising:
   providing a cupped blade with substantially uniform cupping over a longitudinal length of the cupped blade;
   applying a stress relief operation to a selected portion of only a convex side of the cupped blade to increase curvature of the cupped blade in the selected portion of the cupped blade, the stress relief operation comprising bead blasting the selected portion via a dual nozzle shot peening assembly to define a combined bead blast area that is substantially centered with respect to a longitudinal centerline of the blade; and
   operably coupling the cupped blade to a reel assembly and providing the cupped blade and reel assembly within a housing to define the measuring tape device.

13. The method of claim 12, wherein providing the cupped blade with substantially uniform cupping comprises:
   cutting a sheet of material into strips of a desired width;
   heating and drawing the strips through a forming machine to generate cupped strips;
   cooling the cupped strips; and
   chopping the cupped strips to a desired length to define the cupped blade.

14. The method of claim 12, wherein providing the cupped blade with substantially uniform cupping further comprises tempering the cupped strips prior to chopping the cupped strips.

15. The method of claim 12, wherein applying the stress relief operation comprises employing shot peening to plastically deform the selected portion via a first nozzle and a second nozzle of the dual nozzle such that a bead stream from each of the first and second nozzles is angled with respect to a plane bisecting a longitudinal centerline of the blade.

16. The method of claim 12, wherein applying the stress relief operation comprises employing shot peening to plastically deform the selected portion via a first nozzle and a second nozzle of the dual nozzle such that a bead stream from each of the first and second nozzles is parallel with respect to a plane bisecting a longitudinal centerline of the blade.

17. The method of claim 12, wherein applying the stress relief operation comprises employing shot peening to plastically deform the selected portion via a first nozzle and a second nozzle of the dual nozzle, wherein the first and second nozzles of the dual nozzle are disposed to generate overlapping bead blast areas that each traverse a plane bisecting a longitudinal centerline of the blade.

18. The method of claim 12, wherein applying the stress relief operation comprises employing shot peening to plastically deform the selected portion via a first nozzle and a second nozzle of the dual nozzle, wherein the first and second nozzles of the dual nozzle are disposed to generate non-overlapping bead blast areas that meet each other at a plane bisecting a longitudinal centerline of the blade.

19. The method of claim 12, wherein applying the stress relief operation comprises employing shot peening to plastically deform the selected portion via a first nozzle and a second nozzle of the dual nozzle, wherein the first and second nozzles of the dual nozzle are disposed to be separated from each other along a length of the blade such that the first nozzle aims a first bead stream substantially at a left side of a plane bisecting a longitudinal centerline of the blade and the second nozzle aims a second bead stream substantially at a right side of the plane.

20. The method of claim 12, wherein applying the stress relief operation comprises employing shot peening to plastically deform the selected portion via a first nozzle and a second nozzle of the dual nozzle, wherein the first and second nozzles of the dual nozzle are configured to simultaneously apply the first and second bead streams to a same location along a length of the blade or sequentially apply the first and second bead streams to a same location along a length of the blade.

* * * * *